Nov. 17, 1964  R. DRYSDALE  3,157,169
VACUUM CONTROL FOR CRANKCASE VENTILATION
Filed Feb. 19, 1962
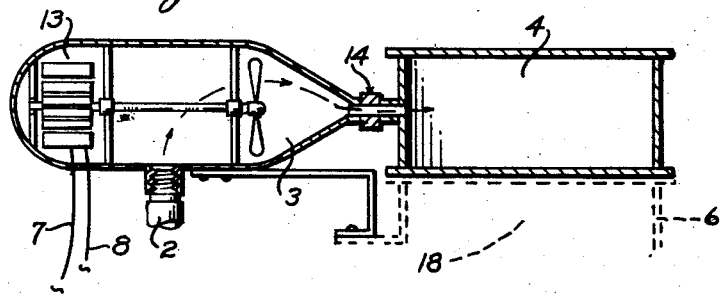
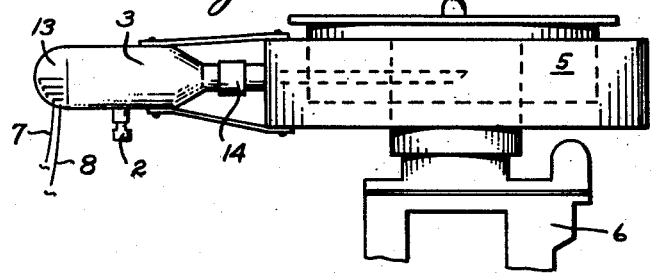
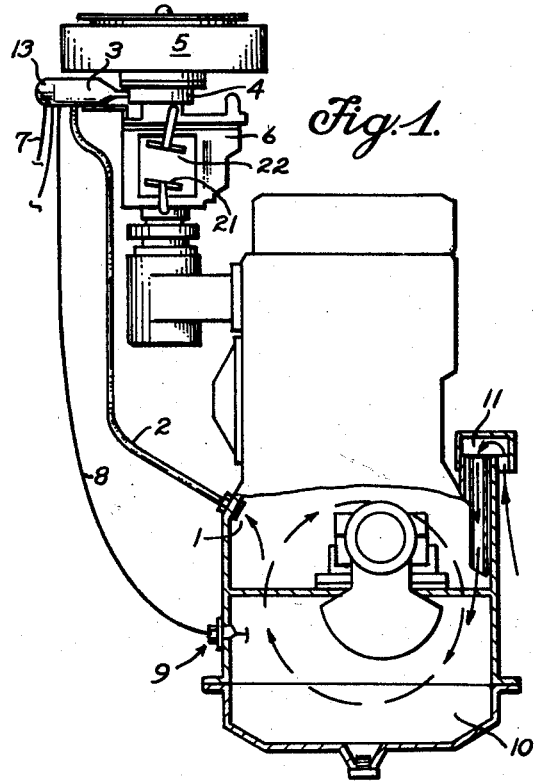
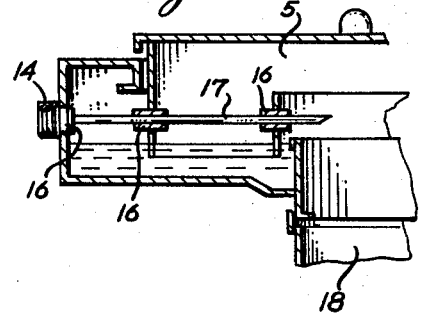
INVENTOR.
ROBERT DRYSDALE
BY
John J. Leavitt > # United States Patent Office > 3,157,169
> Patented Nov. 17, 1964

3,157,169
VACUUM CONTROL FOR CRANKCASE
VENTILATION
Robert Drysdale, 22240 Prospect St., Hayward, Calif.
Filed Feb. 19, 1962, Ser. No. 174,044
4 Claims. (Cl. 123—119)

This invention relates to vacuum controlled ventilation of the crankcase of internal combustion engines as used on automotive vehicles.

It is known that vapors of oils, gasoline, acids, and water are found in the oil pan and lower crankcase of internal combustion engines, where they become mixed with the oil and render it less effective.

To prevent this result, it is known in the art to apply a tube or conduit to the upper part of the crankcase and connect this tube or conduit to the intake manifold of the engine so that the suction of the manifold will draw unburned vapors from the crankcase through the tube or conduit and deliver them to the combustion chamber where they are burned and expelled in due process past the exhaust valve and out the exhaust pipe.

When the throttle valve of the carburetor is very near its full open position, as when climbing steep hills or at very high speeds, the suction of the manifold is not very great so that the force with which the manifold suction draws vapors through the tube or conduit from the crankcase is not particularly high. At such times the blow-by past the piston rings into the lower crankcase and oil pan is at its maximum, requiring more ventilation.

When the throttle of the carburetor is in partly closed, as in idling position, the difference in pressure between the atmosphere and the intake manifold is relatively high and at times attains a value of as much as 18 inches of water or more. When such a large difference in pressure exists at a time when the demand for fuel mixture is small, there will be a tendency to draw a large quantity of air through the ventilating tube or conduit into the intake manifold, which will seriously upset proper carburetion because of excessive dilution of the mixture.

It is the object of the present invention to provide a vacuum control means or member which can be placed in the tube or conduit between the crankcase and the intake manifold, as between the top of the carburetor and air cleaner, where the suction into the top of the carburetor is very low and more even.

Another object of the invention is to provide a connection into the top of the air cleaner, or between the air cleaner and carburetor, and which flow control member includes an electric motor-driven vacuum pump and blower controlled by a vacuum controlled rheostat switch to maintain the vacuum pressure in the crankcase below atmospheric pressure at all times and discharge the fumes from the crankcase into a fitting between the air cleaner and top of the carburetor or into the top of the air cleaner, when the engine is climbing steep hills, high speeds, or the carburetor throttle valve is in any position.

These, together with other objects and advantages, will become apparent from the details of construction and operation as more fully described and claimed hereinafter, reference being had to the accompanying description and drawings, wherein like numerals refer to like parts throughout.

Referring to the drawings:

FIG. 1 is an end view of an automobile engine with parts broken away and shown in section and showing the invention applied.

FIG. 2 is an enlarged schematic view showing the electric motor, vacuum pump and blower connected to the fitting between the top of carburetor and air cleaner.

FIG. 3 is an elevation showing the electric motor, vacuum pump and blower connected through the air cleaner.

FIG. 4 is a cross-sectional view illustrating the fitting that connects the electric vacuum pump and blower to the air cleaner.

FIGS. 3 and 4 are different embodiments of the invention illustrated in FIG. 1.

FIG. 1 illustrates an internal combustion engine with the invention applied, showing the crankcase 10 with opening 11 on one side as shown for air to enter. Drawn by the electric motor-driven vacuum pump and blower 3 through the crankcase 10, the fumes and blow-by are sucked through the opening 1 in the crankcase into tube or conduit 2, past the electric motor-driven vacuum pump and blower 3, then forced into tube or connection 14 of fitting 4, installed between carburetor 6 and air cleaner 5 as illustrated best in FIG. 1. The fumes are then sucked through the carburetor 6 past choke valve 22, mixed with a new fuel charge passing throttle valve 21, then through the manifold into the combustion chamber of engine and then out the exhaust.

FIG. 4 illustrates an alternate embodiment used on some installations wherein the electric motor-driven vacuum pump and blower are connected as at 14 to tube 17 extending through the air cleaner 5 as shown and held in place by bushings 16. The fumes are sucked through air cleaner outlet tube 18 into the top of the carburetor, past the choke valve 22, mixed with a new fuel charge passing throttle valve 21, then through the manifold into the combustion chamber of engine and then out the exhaust.

To operate the electric motor-driven vacuum pump and blower crankcase ventilation system, the ignition switch is turned on and the engine started. Wire 7 is energized by electric current which flows to the electric motor 13 of the vacuum pump and blower 3 from a vacuum rheostat switch 9. The rheostat makes contact to the ground on one side so as to complete the circuit to start the electric motor-driven vacuum pump and blower. The vacuum rheostat switch controls the speed of the electric motor 13 to keep fumes and blow-by moving through the crankcase and into the fitting 4 mounted on the carburetor 6, as shown in FIG. 2, or in the alternative as shown in the embodiment illustrated in FIG. 3. This effectively maintains the vacuum pressure inside the crankcase below the air pressure outside so there is no discharge of fumes or blow-by from the crankcase vent or breather tube 11 at any time when the engine is running regardless of the carburetor throttle valve position, or engine speeds, or engine load conditions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

Having thus completely and fully described the invention, what is now claimed as new is as follows:

1. In combination with an internal combustion engine having a crankcase through which fumes and oil vapors circulate, a ventilating system for the crankcase to effect channeling of the fumes and oil vapors into the combustion chambers of the engine comprising a passageway including a conduit connected between the interior of the crankcase and the combustion chambers of the engine, means interposed in said passageway to draw fumes and oil vapors from the crankcase and impel them into the combustion chambers, and control means operatively associated with the crankcase and said impelling means interposed in the passageway to increase or decrease the force with which said fumes and vapors are impelled into the combustion chambers of the engine in correlation to varying pressure conditions within the crankcase.

2. The combination according to claim 1, in which said impelling means includes an electric motor-driven impeller enclosed in said passageway, and said control means includes a pressure sensitive rheostat operatively connected to the interior of the crankcase to effect variation in the electric current carried to the impeller motor to increase or decrease the force with which fumes and oil vapors are impelled into the combustion chambers in correlation to pressure conditions within the crankcase.

3. The combination according to claim 1, in which said passageway includes an air cleaner assembly and a carburetor, and said conduit channels fumes and vapors first through the air cleaner and then through the carburetor.

4. The combination according to claim 1, in which said crankcase is provided with an air inlet, said passageway constitutes an outlet from the crankcase, and said impelling means effects a lowering of the pressure at said air inlet to below atmospheric pressure so as to cause air to flow into the crankcase through said inlet tube.

References Cited in the file of this patent

UNITED STATES PATENTS 2,271,150    Dressler  ---------------- Jan. 27, 1942